US012561610B2

(12) United States Patent
Li et al.

(10) Patent No.: US 12,561,610 B2
(45) Date of Patent: Feb. 24, 2026

(54) METHOD AND APPARATUS FOR PRESENTING CANDIDATE CHARACTER STRING, AND METHOD AND APPARATUS FOR TRAINING DISCRIMINATIVE MODEL

(71) Applicant: Baidu International Technology (Shenzhen) Co., Ltd., Shenzhen (CN)

(72) Inventors: Lingao Li, Shenzhen (CN); Gang Qiao, Shenzhen (CN); Qiaofei Wang, Shenzhen (CN)

(73) Assignee: Baidu International Technology (Shenzhen) Co., Ltd., Shenzhen (CN)

( * ) Notice: Subject to any disclaimer, the term of this patent is extended or adjusted under 35 U.S.C. 154(b) by 857 days.

(21) Appl. No.: 17/868,647

(22) Filed: Jul. 19, 2022

(65) Prior Publication Data

US 2022/0351085 A1 Nov. 3, 2022

(30) Foreign Application Priority Data

Nov. 3, 2021 (CN) .......................... 202111294478.6

(51) Int. Cl.
*G06N 20/00* (2019.01)
*G06F 3/023* (2006.01)
(Continued)

(52) U.S. Cl.
CPC ....... *G06N 20/00* (2019.01); *G06V 30/19007* (2022.01); *G06V 30/19193* (2022.01);
(Continued)

(58) Field of Classification Search
CPC .... G06N 20/00; G06N 7/01; G06V 30/19007; G06V 30/19193; G06V 30/19147;
(Continued)

(56) References Cited

U.S. PATENT DOCUMENTS

2013/0159000 A1* 6/2013 Ju ........................ G10L 15/1822
704/E15.005

FOREIGN PATENT DOCUMENTS

CN 101853126 A * 10/2010
CN 102156551 A 8/2011
(Continued)

OTHER PUBLICATIONS

Hassanin et al., ("Adaptive English Pronunciation Errors for Arab Learners of English" Published 2012 "Google Scholar" Total 22 Pages (Year: 2012).*

(Continued)

*Primary Examiner* — Quoc A Tran
(74) *Attorney, Agent, or Firm* — Knobbe, Martens, Olson & Bear, LLP

(57) ABSTRACT

A method and an apparatus for presenting a candidate character string and a method and an apparatus for training a discriminative model are provided. The method for presenting a candidate character string may include: acquiring a character string of alphabetic words inputted by a user; determining a character transition weight of the character string, the character transition weight being used to characterize a transition probability of a character; generating a sort weight corresponding to the character string based on a pre-acquired basic weight matching the character string and the character transition weight; and selecting, according to an order indicated by the sort weight, at least two candidate character strings matching the character string from a pre-acquired candidate character string set for presentation.

16 Claims, 6 Drawing Sheets

<u>100</u>

(51) Int. Cl.

| | |
|---|---|
| *G06F 8/41* | (2018.01) |
| *G06F 40/232* | (2020.01) |
| *G06N 7/01* | (2023.01) |
| *G06V 30/19* | (2022.01) |
| *G06V 30/262* | (2022.01) |
| *G10L 13/08* | (2013.01) |

(52) U.S. Cl.
CPC ............ *G06F 3/0237* (2013.01); *G06F 8/436*
(2013.01); *G06F 40/232* (2020.01); *G06N 7/01*
(2023.01); *G06V 30/19147* (2022.01); *G06V*
*30/262* (2022.01); *G10L 13/08* (2013.01)

(58) Field of Classification Search
CPC . G06V 30/262; G06F 3/0237; G06F 7/70441;
G06F 40/232; G06F 8/436; G10L 13/08
See application file for complete search history.

(56) References Cited

FOREIGN PATENT DOCUMENTS

| | | | |
|---|---|---|---|
| CN | 106468960 | A | 3/2017 |
| CN | 106557175 | A | 4/2017 |
| CN | 106774970 | A | 5/2017 |
| CN | 106774975 | A | 5/2017 |
| CN | 109656384 | A | 4/2019 |
| CN | 110262674 | A | 9/2019 |
| CN | 111090341 | A | 5/2020 |
| CN | 112989148 | A | 6/2021 |
| WO | WO2020065695 | A1 | 3/2021 |

OTHER PUBLICATIONS

Keysers et al., ("Multi-Language Online Handwriting Recognition"
Published 2016 By EEE Total 15 Pages (Year: 2016).*
Long, C. (2012). The Improvement and Implementation of Mixed
Languagemodel on Japanese Input Method. Harbin Institute of
Technology. Jun. 2012.

* cited by examiner

METHOD AND APPARATUS FOR PRESENTING CANDIDATE CHARACTER STRING, AND METHOD AND APPARATUS FOR TRAINING DISCRIMINATIVE MODEL

CROSS-REFERENCE TO RELATED APPLICATIONS

The present application claims the priority of Chinese Patent Application No. 202111294478.6, titled "METHOD AND APPARATUS FOR PRESENTING CANDIDATE CHARACTER STRING, AND METHOD AND APPARA-TUS FOR TRAINING DISCRIMINATIVE MODEL", filed on Nov. 3, 2021, the content of which is incorporated herein by reference in its entirety.

TECHNICAL FIELD

The present disclosure relates to the field of computer technology, and specifically to the input method technology and the machine learning technology, and particular to a method and apparatus for presenting a candidate character string and a method and apparatus for training a discrimi-native model.

BACKGROUND

With the development of computer technology, the impor-tance of an input method technology for human-machine interaction is becoming more and more apparent. Moreover, how to accurately predict the real input thought of a user to make the presentation of a candidate word more accurate produces a great impact on improving an input efficiency. As an example, when the user inputs "Talj," it should be corrected to "Talk" by an error correction strategy. As another example, when the user inputs "Apk," if there is no ready-made word in a word bank, it is usually corrected to "Ask," "All," etc. by the error correction strategy, but in fact the user wants the originally inputted string "Apk."

SUMMARY

A method and apparatus for presenting a candidate char-acter string, a method and apparatus for training a discrimi-native model, an electronic device and a storage medium are provided.

According to a first aspect, a method for presenting a candidate character string is provided. The method includes: acquiring a character string of alphabetic words inputted by a user; determining a character transition weight of the character string, the character transition weight being used to characterize a transition probability of a character; generat-ing a sort weight corresponding to the character string based on a pre-acquired basic weight matching the character string and the character transition weight; and selecting, according to an order indicated by the sort weight, at least two candidate character strings matching the character string from a pre-acquired candidate character string set, and presenting the at least two candidate character strings.

According a second aspect, a method for training a discriminative model is provided. The method includes: acquiring a training sample set, a training sample in the training sample set comprising a sample transition weight, a sample basic weight and a sample expected weight, wherein the sample transition weight, the sample basic weight and the sample expected weight correspond to a sample charac-ter string of alphabetic words; selecting the training sample from the training sample set and determining, according to the sample transition weight and the sample basic weight in the selected training sample, a sort weight corresponding to the selected training sample using a pre-acquired initial discriminative model; and adjusting a parameter of the initial discriminative model according to a difference between the sort weight corresponding to the selected train-ing sample and the sample expected weight.

According to a third aspect, an apparatus for presenting a candidate character string is provided. The apparatus includes: a first acquiring unit, configured to acquire a character string of alphabetic words inputted by a user; a first determining unit, configured to determine a character tran-sition weight of the character string, the character transition weight being used to characterize a transition probability of a character; a generating unit, configured to generate a sort weight corresponding to the character string based on a pre-acquired basic weight matching the character string and the character transition weight; and a presenting unit, con-figured to select, according to an order indicated by the sort weight, at least two candidate character strings matching the character string from a pre-acquired candidate character string set for presentation, and presenting the at least two candidate character strings.

According to a fourth aspect, an apparatus for training a discriminative model is provided. The apparatus includes a second acquiring unit, configured to acquire a training sample set, a training sample in the training sample set comprising a sample transition weight, a sample basic weight and a sample expected weight, wherein the sample transition weight, the sample basic weight and the sample expected weight correspond to a sample character string of alphabetic words; a second determining unit, configured to select the training sample from the training sample set, and determine, according to the sample transition weight and the sample basic weight in the selected training sample, a sort weight corresponding to the selected training sample using a pre-acquired initial discriminative model; and an adjusting unit, configured to adjust a parameter of the initial discrimi-native model according to a difference between the sort weight corresponding to the selected training sample and the sample expected weight.

According to a fifth aspect, a non-transitory computer-readable storage medium storing computer instructions is provided, where the computer instructions cause a computer to execute the method according to any one implementation in the first aspect or the second aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better under-standing of the scheme, and do not constitute a limitation to the present disclosure. Here.

DETAILED DESCRIPTION OF EMBODIMENTS

Example embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

In the related technology, a rule-based method is used to perform weighted adjustment and sorting on the character string inputted by the user, often resulting in an incomplete coverage, and adopts a form of patching, resulting in a low reusability. The related technology further adopts a Federated learning approach to implement end-to-end training on a recurrent neural network, thereby personalizing and optimizing a user input. However, the deep learning approach results in high training costs and high maintenance costs, and there is a certain difficulty to deploy a model on a mobile device due to a large number of parameters of the model. Moreover, the parameter obtained by Federated learning cannot be adjusted with pertinence, due to the abstractness in actual meaning.

Figure 1:
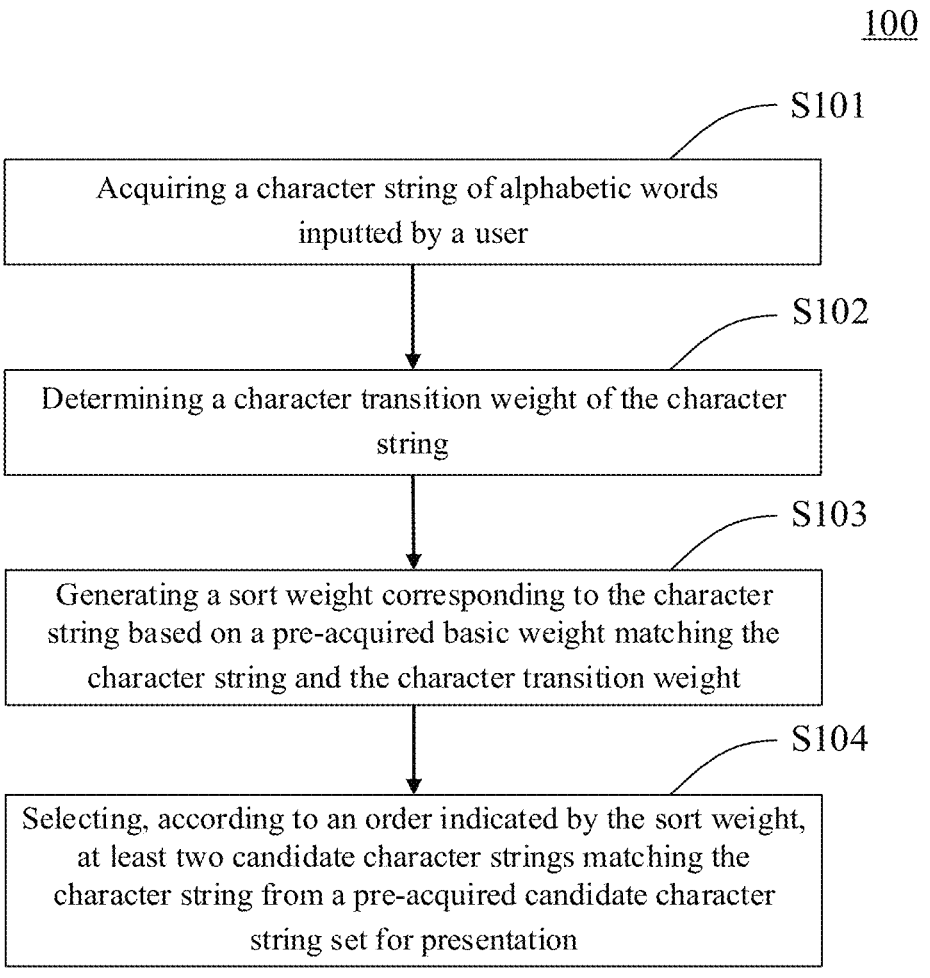
FIG. 1 is a schematic diagram of a method for presenting a candidate character string according to some embodiments of the present disclosure.

FIG. 1 is a schematic diagram 100 of a method for presenting a candidate character string according to some embodiments of the present disclosure. A method for presenting a candidate character string includes the following steps.

S101 includes acquiring a character string of alphabetic words inputted by a user.

In this embodiment, an executing body of the method for presenting a candidate character string may acquire, in various ways, the character string of the alphabetic words inputted by the user. Here, the alphabetic words may include, for example, words of various languages using Latin alphabet, such as English and Indonesian.

As an example, the executing body can directly acquire a character string inputted through a keyboard by the user, for example, "talk." It should be noted that the character string acquired here usually refers to the key codes inputted by the user (i.e., the character string formed by pressing the keys "t," "a," "l" and "k" by the user in sequence), rather than the complete word "talk" on the screen that is finally selected by the user.

As another example, the executing body may alternatively acquire a character string obtained by performing a speech recognition and conversion on the speech inputted through a microphone by the user, for example, "apk." Similarly, the character string acquired here generally refers to successive characters spelled by the user by speech (i.e., the character string formed by the speech "a-p-k" of the user), rather than the complete word "apk" on the screen that is finally selected by the user.

S102 includes determining a character transition weight of the character string.

In this embodiment, the executing body may determine, in various ways, the character transition weight of the character string acquired in step S101. Here, the character transition weight may be used to characterize a transition probability of a character. As an example, the executing body may determine the character transition probability of the character string based on a Markov chain. Then, the executing body may convert, in various ways, the determined character transition probability into a character transition weight. As an example, the executing body may directly determine the character transition probability as the character transition weight. As another example, since the character transition probability is generally small, in order to make the distinction between different character transition probabilities more obvious, the value obtained by taking a log of the character transition probability may be used as the character transition weight. Alternatively, the opposite of the value obtained by taking a log of the character transition probability may be used as the character transition weight.

S103 includes generating a sort weight corresponding to the character string based on a pre-acquired basic weight matching the character string and the character transition weight.

In this embodiment, based on the pre-acquired basic weight matching the character string and the character transition weight determined in step S102, the executing body may generate, in various ways, the sort weight corresponding to the character string acquired in step S101. As an example, the executing body may first acquire a basic weight matching the character string acquired in step S101. Here, the basic weight may generally be acquired according to a preset word bank of an input method. The preset word bank may store various candidate character strings and basic weights corresponding to the character strings. Here, the basic weight may be used to provide a basis for presenting a candidate word. Then, the executing body may fuse the acquired basic weight matching the character string and the determined character transition weight in various ways, to generate the sort weight corresponding to the character string acquired in step S101. Here, the fusion may be, for example, taking a maximum value, taking a minimum value, multiplying or adding, which will not be repeatedly described here.

S104 includes selecting, according to an order indicated by the sort weight, at least two candidate character strings matching the character string from a pre-acquired set of candidate character strings, and presenting the at least two candidate character strings.

In this embodiment, according to the order indicated by the sort weight generated in step S103, the executing body may select, in various ways, the at least two candidate character strings matching the character strings from the pre-acquired candidate character string set, and present the at least two candidate character strings. Here, the candidate character string set may generally be obtained according to the preset word bank of the input method. The executing body may compare the sort weight determined in step S103 with the basic weights corresponding to the character strings in the candidate character string set, to select the character strings corresponding to T greatest or smallest values of the sort weight and the basic weights as the matching candidate character strings for presentation. Here, T described above is generally an integer not smaller than 2. As an example, when the sort weight is positively correlated with the transition probability, the character strings corresponding to T greatest values are selected. When the sort weight is negatively correlated with the transition probability, the character strings corresponding to T smallest values are selected.

According to the method provided in some embodiments of the present disclosure, the sort weight is formed by combining the determined transition weight of the character string inputted by the user and the pre-acquired basic weight, and then, the at least two candidate character strings matching the character string are determined according to the sort weight for presentation. Thus, the candidate character strings matching the character string inputted by the user can be determined from multiple dimensions, thereby improving the accuracy of the candidate character strings, and the deployment can be implemented at a mobile terminal more appropriately due to no requirement for massive parameters.

In some alternative implementations of this embodiment, the executing body may determine the character transition weight of the character string according to the following steps.

In a first step, at least one matching probability is selected from a preset N-nary character transition probability table according to a sub character string contained in the character string.

In these implementations, the preset N-nary character transition probability table may be obtained by performing statistics on the public corpus and the commonly used input corpus. Here, N may be an integer not smaller than 2, for example, 3. As an example, when N is 3, the transition probability of a ternary character "a e z" may be $1.11 \times 10^{-7}$, meaning that when the preceding characters are a and e, the probability that the following character is z is $1.11 \times 10^{-7}$.

In these implementations, the executing body may first determine the sub character string (e.g., "tal" and "alk") contained in the character string (e.g., "talk") acquired in step S101. Then, the executing body may select the probabilities respectively corresponding to "tal" and "alk" from the preset N-nary character transition probability table.

It should be noted that the transition probability of the ternary character may generally have a higher accuracy than that of a transition probability of a binary character, and meanwhile, the capacity of space occupied by the transition probability of the ternary character is significantly smaller than that of a transition probability of a quaternary character, and thus, the transition probability of the ternary character has a better practicality.

In a second step, the character transition weight of the character string is generated according to the selected at least one probability.

In these implementations, the executing body may convert, in various ways, the at least one probability selected in the first step into the character transition weight of the character string acquired in step S101. As an example, the executing body may retain M greatest probabilities (M being a positive integer) from the at least one probability selected in the first step. Then, the executing body may convert the retained M probabilities into corresponding transition weights. As an example, the conversion approach may refer to taking a log. In this case, the transition weight is positively correlated with the character transition probability. As another example, the conversion approach may refer to obtaining an opposite number of a number obtained by taking a log. In this case, the transition weight is negatively correlated with the character transition probability. Referring to the example, when the transition probability of "a e z" is $1.11 \times 10^{-7}$, the transition weights obtained through the different conversion approaches may be −6.955 and 6.955. Then, the executing body may synthesize (e.g., take a maximum value, a minimum value, or a weighted sum) the transition weights obtained by the conversion, to generate the character transition weight of the character string.

Based on the alternative implementations, in this scheme, the character transition weight of the character string can be generated according to the character transition probability corresponding to the sub character string contained in the character string, which enriches the method of generating the character transition weight and which is conducive to improving the accuracy of the character transition weight.

Alternatively, based on the alternative implementations, according to the selected at least one probability, the executing body may generate the character transition weight of the character string according to the following steps.

S2-1 includes fusing the selected at least one probability into a total probability.

In these implementations, the executing body may fuse the selected at least one probability into the total probability. Here, the executing body may perform the fusion by taking a maximum value, a minimum value, a weighted sum, or the like.

S2-2 includes converting the total probability into an integer, to use the integer as the character transition weight of the character string.

In these implementations, the executing body may convert, in various ways, the total probability obtained by fusion in step S2-1 into the integer. As an example, the executing body may convert the total probability into the integer by $-\log(p) \times 1000$. Here, p is used to represent the total probability obtained by fusion in the step S2-1. Referring to the example, the character transition weight obtained by converting the transition probability of "a e z" may be 6955.

Based on the alternative implementations, in this scheme, the decimals, used as the character transition probability and having a minor distinction due to a small numerical value, may be converted to the integer used as the character transition weight, and thus, the operational speed can be improved.

In some alternative implementations of this embodiment, based on the pre-acquired basic weight matching the character string and the character transition weight, the executing body may generate the sort weight corresponding to the character string according to the following steps.

In a first step, the basic weight and the character transition weight are respectively multiplied by pre-acquired coefficients to generate a first result.

In these implementations, the executing body may first acquire the coefficients (e.g., $w_1$ and $w_2$) to be multiplied respectively by the basic weight and the character transition weight. Then, the executing body may add the product of $w_1$ and the pre-acquired basic weight in step S103 and the product of $w_2$ and the character transition weight determined in step S102, to generate the first result.

In a second step, post-processing is performed based on the first result to generate a second result as the sort weight corresponding to the character string.

In these implementations, the executing body may perform, in various ways, the post-processing on the first result generated in the first step, to generate the second result as the sort weight corresponding to the character string. Here, the post-processing may refer to, for example, taking an integer.

Based on the alternative implementations, in this scheme, the sort weight corresponding to the character string can be generated using the pre-acquired coefficients together with the obtained basic weight and the obtained character transition weight, which enriches the method of generating the sort weight and which is conducive to improving the accuracy of the sort weight.

Alternatively, based on the alternative implementations, by performing the post-processing based on the first result, the executing body may generate the second result as the sort weight corresponding to the character string according to the following steps.

S2-1 includes generating a third result according to a length coefficient corresponding to the pre-acquired coefficients and a length of the character string.

In these implementations, the executing body may first acquire a length coefficient (e.g., $w_3$) corresponding to the coefficients acquired in the first step. Then, according to $w_3$ and the length (usually the number of contained characters) of the character string acquired in step S101, the executing body may generate the third result in various ways. As an example, the executing body may correspondingly multiply $w_3$ by the length (usually the number of the contained characters) of the character string acquired in step S101 to obtain the third result.

S2-2 includes adding the first result and the third result to generate the second result.

In these implementations, the executing body may add the first result generated in the first step and the third result generated in the step S2-1, to generate the second result.

Based on the alternative implementations, in this scheme, the sort weight corresponding to the character string can be generated by using the pre-acquired length coefficient together with the length of the character string, which enriches the method of generating the sort weight and which is conducive to improving the accuracy of the sort weight.

Alternatively, based on the alternative implementations, the executing body may add the first result and a bias coefficient corresponding to the coefficients to generate the second result.

In these implementations, the executing body may first acquire the bias coefficient (e.g., b) corresponding to the coefficients acquired in the first step. Then, the executing body may add the first result generated in the first step and the bias coefficient to generate the second result.

Based on the alternative implementations, in this scheme, the sort weight corresponding to the character string can be generated by combining the pre-acquired bias coefficient, the length of the character string, the transition weight and the basic weight, which enriches the method of generating the sort weight and which is conducive to further improving the accuracy of the sort weight.

Alternatively, based on the alternative implementations, the pre-acquired coefficients may be obtained by training a discriminative model according to a training sample.

In these implementations, the pre-acquired coefficients may be obtained by training the discriminative model according to the training sample. The executing body for training the discriminative model may perform parameter fitting on the discriminative model using the training sample, thus generating the corresponding coefficients.

Figure 4:
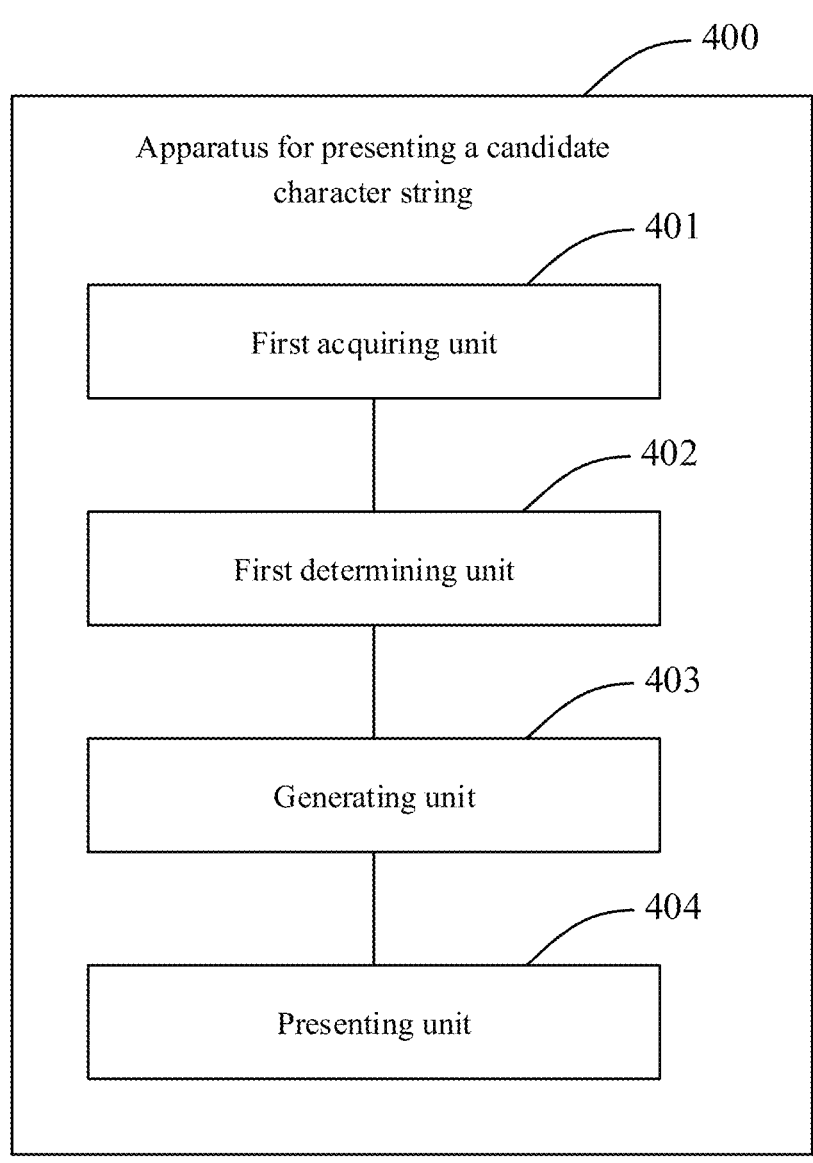
FIG. 4 is a schematic diagram of an apparatus for presenting a candidate character string according to some embodiments of the present disclosure.

Alternatively, the discriminative model may alternatively be trained and obtained through a method for training a discriminative model as shown in FIG. 4, and for the details, reference is made to the following description.

Based on the alternative implementations, in this scheme, the determination for the sort weight can be performed through the pre-acquired coefficients obtained by training the discriminative model. Since only a small number of parameters are required at the time of use, the consumption of performance is low, the dependency on a device configuration is low, and the amount of calculation at the time of use is small, the deployment can also be implemented in a common mobile device with a low configuration.

Alternatively, based on the coefficients obtained by the training, the executing body may multiply the basic weight and the character transition weight by the pre-acquired coefficients respectively to generate the first result, according to the following steps.

S1-1 includes selecting a group of matching coefficients from two groups of coefficients obtained in advance by training, according to whether the character string contains a preset priori character string.

In these implementations, the executing body may pre-acquire two groups of coefficients obtained by training. Here, one group of coefficients (e.g., $w_1$ and $w_2$) correspond to the situation where preset priori character string is contained, and the other group of coefficients (e.g., $w'_1$ and $w'_2$) correspond to the situation where preset priori character string is not contained. Here, the preset priori character string may include, for example, a commonly used suffix (e.g., "ment," "ness," "ion" and "ing") and a commonly used prefix (e.g., "trans" and "com"). The executing body may select the group of matching coefficients from the two groups of coefficients obtained in advance by the training, according to whether the character string acquired in step S101 contains the preset priori character string.

S1-2 includes multiplying the basic weight and the character transition weight by the selected coefficients respectively to generate the first result.

In these implementations, the executing body may multiply the pre-acquired basic weight in step S103 and the character transition weight determined in step S102 by the coefficients selected in step S1-1 respectively, and then add the products thereof, thus generating the first result.

Based on the alternative implementations, in this scheme, the matching coefficients can be determined according to whether the character string contains the preset priori character string, and then, the first result corresponding to the character string is generated. The more targeted coefficients determined according to different situations are added, which is conducive to improving the accuracy of the sort weight.

In some alternative implementations of this embodiment, the basic weight is associated with at least one of: an n-gram language model, a default value, or a length of a character string.

In these implementations, as an example, the basic weight may be obtained through the n-gram language model. As another example, the basic weight may be the default value, for example, the basic weight is set to 10 or 10000 by converting the character transition weight according to the transition probability. As yet another example, the basic weight may be obtained through the n-gram language model according to the length of the character string. As yet another example, the basic weight may be determined according to the length of the character string. For example, when the transition weight is positively correlated with the transition probability of the character, the basic weight is negatively correlated with the length of the character string. When the transition weight is negatively correlated with the transition probability of the character, the basic weight is positively correlated with the length of the character string.

Based on the alternative implementations, in this scheme, the basic weight can be determined through at least one of the n-gram language model, the default value or the length of the character string, thereby enriching the method of determining the basic weight.

Figure 2:
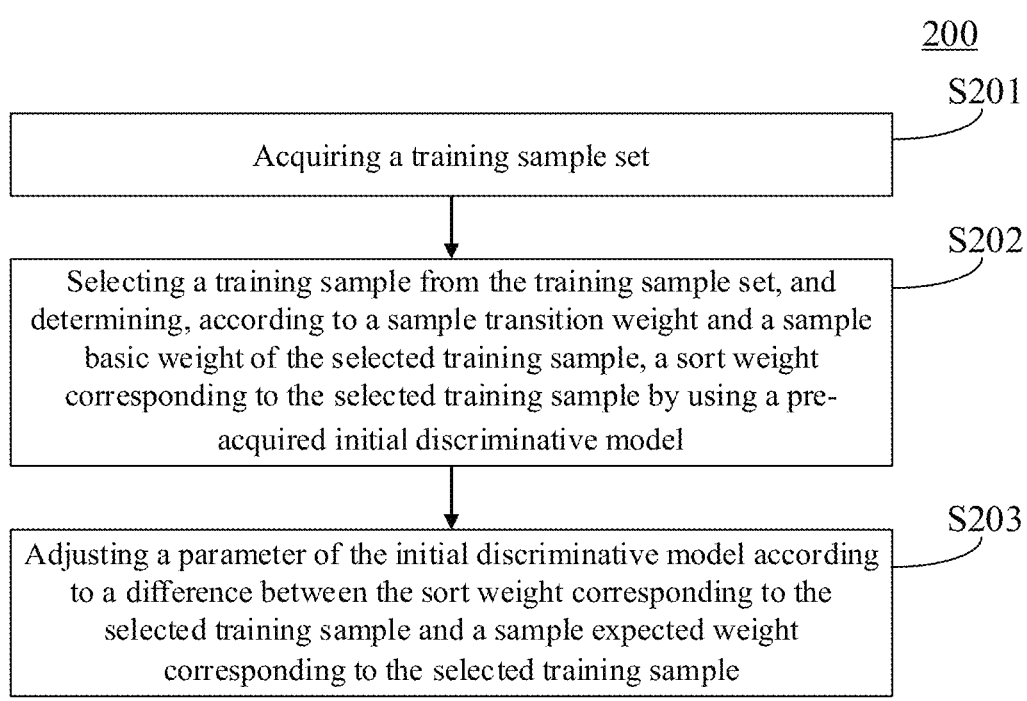
FIG. 2 is a schematic diagram of a method for training a discriminative model according to some embodiments of the present disclosure.

Further referring to FIG. 2, FIG. 2 is a schematic diagram 200 of a method for training a discriminative model according to some embodiments of the present disclosure. A method for training a discriminative model includes the following steps.

S201 includes acquiring a training sample set.

In this embodiment, an executing body of the method for training a discriminative model may acquire the training sample set in various ways. Here, a training sample in the training sample set may include a sample transition weight, a sample basic weight and a sample expected weight that correspond to a sample character string of alphabetic words. As an example, the training sample may refer to "hello 13452 693 12785." Here, "hello" may be a sample character string, "13452" may be a sample transition weight corresponding to the sample character string, "693" may be a sample basic weight corresponding to the sample character string, and "12785" may be an expected weight corresponding to the sample character string.

S202 includes selecting a training sample from the training sample set, and determining, according to a sample transition weight and a sample basic weight in the selected training sample, a sort weight corresponding to the selected training sample using a pre-acquired initial discriminative model.

In this embodiment, the executing body may select the training sample from the training sample set acquired in step S201. Then, according to the sample transition weight and the sample basic weight in the selected training sample, the executing body may determine, in various ways, the sort weight corresponding to the selected training sample using the pre-acquired initial discriminative model. Here, the initial discriminative model may include to-be-adjusted coefficients (e.g., $w_1$ and $w_2$).

In this embodiment, as an example, the executing body may respectively multiply the to-be-adjusted coefficients (e.g., $w_1$=0.6 and $w_2$=0.4) corresponding to the pre-acquired initial discriminative model by the sample transition weight (e.g., 13452) and the sample basic weight (e.g., 693) in the selected training sample, and then determine the result (e.g., 8348.4) obtained by adding the obtained products as the sort weight corresponding to the selected training sample.

Alternatively, the initial discriminative model may further include a to-be-adjusted bias coefficient.

S203 includes adjusting a parameter of the initial discriminative model according to a difference between the sort weight corresponding to the selected training sample and a sample expected weight.

In this embodiment, according to the difference between the sort weight corresponding to the selected training sample and the sample expected weight, the executing body may adjust the parameter of the initial discriminative model by various machine learning methods, such that the difference between the sort weight corresponding to the selected training sample and the sample expected weight tends to be reduced. As an example, referring to the foregoing, since the sort weight corresponding to the selected training sample is smaller than the expected weight corresponding to the training sample, the executing body may increase the values of the to-be-adjusted coefficients (e.g., $w_1$=0.7 and $w_2$=0.5) according to a preset learning rate.

Alternatively, the executing body may stop training when a training stop condition is satisfied, and determine the initial discriminative model on which the training is completed as the discriminative model. If the training stop condition is not satisfied, the executing body may re-select a training sample from the training sample set, continue to perform training based on the initial discriminative model with the adjusted parameter, and determine the initial discriminative model on which the training is completed as the discriminative model.

According to the method provided in some embodiments of the present disclosure, the pre-acquired initial discriminative model is trained through the training sample including the sample transition weight, the sample basic weight and the sample expected weight that correspond to the sample character string of the alphabetic words, thus obtaining the trained initial discriminative model. As compared with the existing model trained through a deep learning method, the model has a higher parameter interpretability, and thus, the preferred direction of a candidate word can be controlled by adjusting a corresponding feature weight. Moreover, this scheme has a smaller number of parameters and a low dependency on device configuration, which makes the training implemented more easily.

In some alternative implementations of this embodiment, the training sample set may include positive samples and negative samples in a preset proportion. Here, the sample expected weight corresponding to a positive sample may be used to indicate an expectation that the sample character string is a first choice for the candidate character string. The sample expected weight corresponding to a negative sample may be used to indicate an expectation that the sample character string is a non-first choice for the candidate character string.

In these implementations, as an example, when the character transition weight is negatively correlated with the transition probability of the character, the sample expected weight corresponding to the positive sample tends to decrease, and the sample expected weight corresponding to the negative sample tends to increase. As another example, when the character transition weight is positively correlated with the transition probability of the character, the sample expected weight corresponding to the positive sample tends to increase, and the sample expected weight corresponding to the negative sample tends to decrease.

Based on the alternative implementations, in this scheme, the direction of error correction of the input method can be controlled by the preset proportion of the positive samples and the negative samples. For example, if it is desired to increase the probability that the character string inputted by the user is the first choice (i.e., reduce the intensity of error correction), the proportion of the positive samples may be increased. It should be noted that with higher proportion of the positive samples, the error correction function is reduced. It is therefore usually needed to add a large number of normal samples for evaluation, to ensure that the accuracy of the error correction is reserved while the probability that the inputted string is the first choice is increased.

In some alternative implementations of this embodiment, the training sample in the training sample set may further include a character string length corresponding to the sample character string. The sample basic weight may be associated with the character string length corresponding to the sample character string.

In these implementations, as an example, the training sample may be "hello 13452 693 12785 5." Here, "hello" may be a sample character string, "13452" may be a sample transition weight corresponding to the sample character string, "693" may be a sample basic weight corresponding to the sample character string, "12785" may be an expected weight corresponding to the sample character string, and "5" may be a character string length corresponding to the sample character string. The sample basic weight may be determined according to the length of the sample character string. For example, when the transition weight is positively correlated with the transition probability of the character, the sample basic weight is negatively correlated with the length of the sample character string. When the transition weight is negatively correlated with the transition probability of the character, the sample basic weight is positively correlated with the length of the sample character string.

Based on the alternative implementations, in this scheme, a length coefficient can be obtained by performing training using the character string length corresponding to the sample character string, which enriches the dimension of the parameter influencing the sort weight and which is conducive to further improving the accuracy of the sort weight.

In some alternative implementations of this embodiment, according to the following steps, the executing body may select the training sample from the training sample set, and determine, according to the sample transition weight and the sample basic weight in the selected training sample, the sort weight corresponding to the selected training sample using the pre-acquired initial discriminative model.

In a first step, a matching initial discriminative model is selected from two preset initial discriminative models as a target initial discriminative model, according to whether the training sample selected from the training sample set contains a preset priori character string.

In these implementations, the executing body may first determine whether the training sample selected from the training sample set contains the preset priori character string, and use a training sample containing the preset priori character string to train one of the two preset initial discriminative models, and a training sample not containing the preset priori character string to train the other one of the two preset initial discriminative models. Here, the preset priori character string may be consistent with the corresponding description in the foregoing embodiment, and thus will not be repeatedly described here.

In a second step, according to the sample transition weight and the sample basic weight in the selected training sample, the sort weight corresponding to the selected training sample is determined using the target initial discriminative model.

In these implementations, according to the corresponding relationships between the training sample and the initial discriminative models that are determined in the first step, the executing body may determine the sort weight corresponding to the selected training sample according to the matching target initial discriminative model (e.g., a weighted sum of a coefficients corresponding to the target initial discriminative model).

In a third step, the executing body may further adjust a parameter of the target initial discriminative model according to the difference between the sort weight corresponding to the selected training sample and the sample expected weight.

In these implementations, with reference to the approach in step S203, the executing body may adjust the parameter of the corresponding initial discriminative model according to whether the selected training sample contains the preset priori character string.

Based on the alternative implementations, in this scheme, the two discriminative models can be trained according to whether the character string contains the preset priori character string, which is used to provide two coefficients for different situations. The more targeted coefficients determined according to different situations are added, which is conducive to improving the accuracy of the sort weight.

In some alternative implementations of this embodiment, the executing body may further use the parameter corresponding to the initial discriminative model with the adjusted parameter in step S203, to generate the sort weight corresponding to the character string based on the pre-acquired basic weight matching the character string and the character transition weight; and then select, according to an order indicated by the sort weight, at least two candidate character strings matching the character string from a pre-acquired candidate character string set for presentation. Alternatively, for the specific implementation of the steps, reference may be made to the corresponding description in the foregoing embodiment, and thus the details will not be repeatedly described here.

Based on the alternative implementations, in this scheme, the approach of training the discriminative model can be applied to the method for presenting a candidate character string. The coefficients corresponding to the basic weight and the character transition weight are provided, which is conducive to improving the accuracy of sorting the candidate character string.

Figure 3:
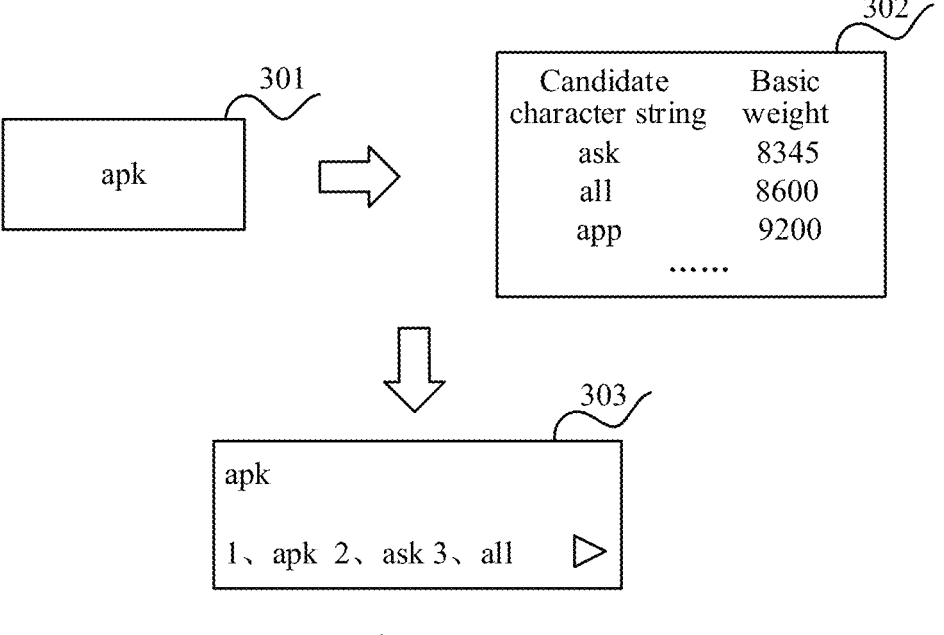
FIG. 3 is a schematic diagram of an application scenario in which a method for presenting a candidate character string according to some embodiments of the present disclosure may be implemented.

Further referring to FIG. 3, FIG. 3 is a schematic diagram of an application scenario of the method for presenting a candidate character string according to some embodiments of the present disclosure. In the application scenario of FIG. 3, a user inputs a character string "apk" 301 using a terminal device. The terminal device may determine a transition weight (e.g., 6200) of the character string "apk" 301 based on a Markov chain. Then, the terminal device may generate a sort weight (e.g., 8100) of the character string "apk" 301 based on a basic weight (e.g., 10000) pre-acquired from a word bank 302 and matching the character string "apk" 301 and the transition weight. Then, according to the comparison between the sort weight, and candidate character strings in a candidate character string set in the word bank 302 and corresponding basic weights, the terminal device may select three character strings with smallest weights as matching candidate character strings 303 for presentation.

Currently, one of the related technology usually adopts a rule-based method to perform weight adjustment and sorting on the character string inputted by the user, often resulting in an incomplete coverage and a low reusability. The related technology further adopts a Federated learning approach to implement end-to-end training on a recurrent neural network, thereby personalizing and optimizing a user input. However, due to the large number of parameters, the training cost and the maintenance cost are high and there is a certain difficulty to deploy a model on a mobile device. According to the method provided in some embodiments of the present disclosure, the sort weight is formed by combining the determined transition weight of the character string inputted by the user and the pre-acquired basic weight, and then, the at least two candidate character strings matching the character string are determined according to the sort weight, for presentation.

Thus, the candidate character strings matching the character string inputted by the user can be determined from multiple dimensions, thereby improving the accuracy of the candidate character strings, and the deployment can be implemented at a mobile terminal more appropriately due to no requirement for massive parameters.

Further referring to FIG. 4, as an implementation of the method shown in the drawings, the present disclosure provides some embodiments of an apparatus for presenting a candidate character string. The embodiment of the apparatus corresponds to the embodiment of the method shown in FIG. 1, and the apparatus may be applied in various electronic devices.

As shown in FIG. 4, the apparatus 400 for presenting a candidate character string provided in this embodiment includes: a first acquiring unit 401, a first determining unit 402, a generating unit 403 and a presenting unit 404. Here, the first acquiring unit 401 is configured to acquire a character string of alphabetic words inputted by a user. The first determining unit 402 is configured to determine a character transition weight of the character string, the character transition weight being used to characterize a transition probability of a character. The generating unit 403 is configured to generate a sort weight corresponding to the character string based on a pre-acquired basic weight matching the character string and the character transition weight. The presenting unit 404 is configured to select, according to an order indicated by the sort weight, at least two candidate character strings matching the character string from a pre-acquired candidate character string set, and present the at least two candidate character strings.

In this embodiment, for specific processes of the first acquiring unit 401, the first determining unit 402, the generating unit 403 and the presenting unit 404 in the apparatus 400 for presenting a candidate character string, and their technical effects, reference may be respectively made to relative descriptions in steps S101, S102, S203 and S204 in the corresponding embodiment of FIG. 1, and thus, the details will not be repeatedly described here.

In some alternative implementations of this embodiment, the first determining unit 402 may include: a selecting module (not shown), configured to select at least one matching probability from a preset N-nary character transition probability table according to a sub character string contained in the character string; and a first generating module (not shown), configured to generate the character transition weight of the character string according to the selected at least one probability.

In some alternative implementations of this embodiment, the first generating module may be further configured to fuse the selected at least one probability into a total probability; and convert the total probability into an integer to be used as the character transition weight of the character string.

In some alternative implementations of this embodiment, the generating unit 403 may include: a second generating module (not shown), configured to multiply the basic weight and the character transition weight by pre-acquired coefficients respectively to generate a first result; and a third generating module (not shown), configured to perform post-processing based on the first result to generate a second result as the sort weight corresponding to the character string.

In some alternative implementations of this embodiment, the third generating module may be further configured to: generate a third result according to a length coefficient corresponding to the pre-acquired coefficients and a length of the character string; and add the first result and the third result to generate the second result.

In some alternative implementations of this embodiment, the third generating module may be further configured to: add the first result and a bias coefficient corresponding to the coefficients to generate the second result.

In some alternative implementations of this embodiment, the pre-acquired coefficients may be obtained by training a discriminative model according to a training sample.

In some alternative implementations of this embodiment, the second generating module may be further configured to:

select, according to whether the character string contains a preset priori character string, a group of matching coefficients from two groups of coefficients obtained in advance by training; and multiply the basic weight and the character transition weight by the selected coefficients respectively to generate the first result.

In some alternative implementations of this embodiment, the basic weight may be associated with at least one of: an n-gram language model, a default value, or a length of a character string.

According to the apparatus provided in some embodiments of the present disclosure, the generating unit 403 combines the transition weight of the character string inputted by the user that is determined by the first determining unit 402 and the pre-acquired basic weight to form the sort weight, and then the presenting unit 404 determines the at least two candidate character strings matching the character string according to the sort weight, for presentation. Thus, the candidate character strings matching the character string inputted by the user can be determined from multiple dimensions, thereby improving the accuracy of the candidate character strings, and the deployment can be implemented at a mobile terminal more appropriately due to no requirement for massive parameters.

Figure 5:
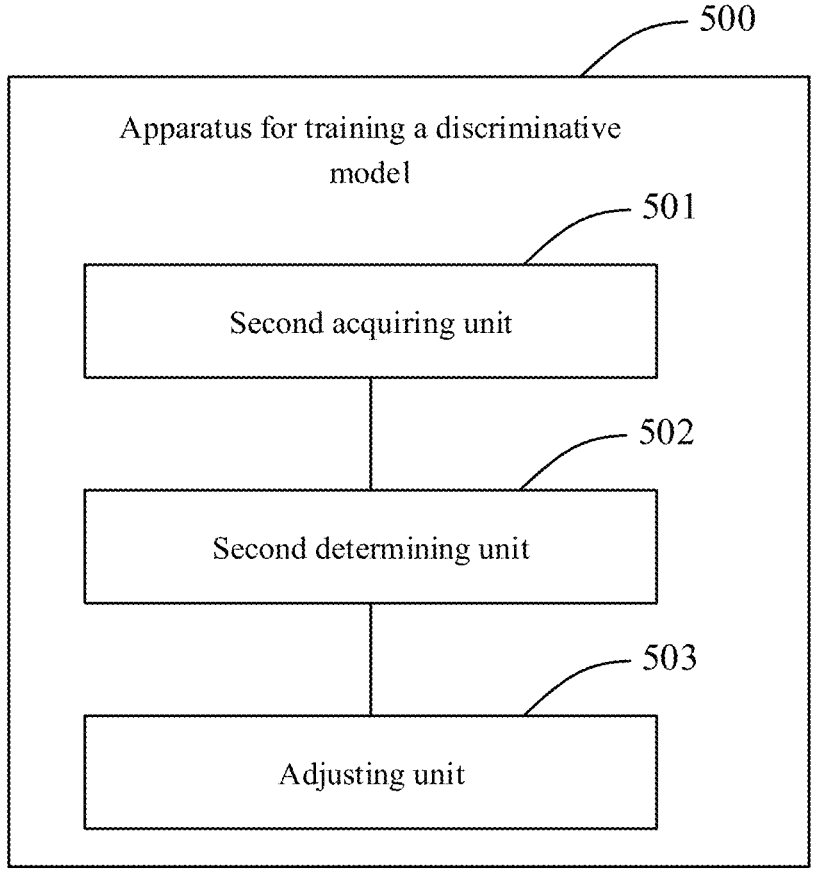
FIG. 5 is a schematic diagram of an apparatus for training a discriminative model according to some embodiments of the present disclosure.

Further referring to FIG. 5, as an implementation of the method shown in the drawings, the present disclosure provides some embodiments of an apparatus for training a discriminative model. The embodiment of the apparatus corresponds to the embodiment of the method shown in FIG. 2, and the apparatus may be applied in various electronic devices.

As shown in FIG. 5, the apparatus 500 for training a discriminative model provided in this embodiment includes: a second acquiring unit 501, a second determining unit 502 and an adjusting unit 503. Here, the second acquiring unit 501 is configured to acquire a training sample set, a training sample in the training sample set including a sample transition weight, a sample basic weight and a sample expected weight that correspond to a sample character string of alphabetic words. The second determining unit 502 is configured to select a training sample from the training sample set, and determine, according to a sample transition weight and a sample basic weight in the selected training sample, a sort weight corresponding to the selected training sample using a pre-acquired initial discriminative model. The adjusting unit 503 is configured to adjust a parameter of the initial discriminative model according to a difference between the sort weight corresponding to the selected training sample and a sample expected weight.

In this embodiment, for specific processes of the second acquiring unit 501, the second determining unit 502 and the adjusting unit 503 in the apparatus 500 for training a discriminative model, and their technical effects, reference may be respectively made to relative descriptions in steps S201, S202 and S203 in the corresponding embodiment of FIG. 2, and thus, the details will not be repeatedly described here.

In some alternative implementations of this embodiment, the training sample set may include positive samples and negative samples in a preset proportion. A sample expected weight corresponding to a positive sample may be used to indicate an expectation that the sample character string is a first choice for the candidate character string. The sample expected weight corresponding to a negative sample may be used to indicate an expectation that the sample character string is a non-first choice for the candidate character string.

In some alternative implementations of this embodiment, the training sample in the training sample set may further include a character string length corresponding to the sample character string. The sample basic weight may be associated with the character string length corresponding to the sample character string.

In some alternative implementations of this embodiment, the second determining unit 502 may be further configured to: select a matching initial discriminative model from two preset initial discriminative models as a target initial discriminative model, according to whether the training sample selected from the training sample set contains a preset priori character string; and determine, according to the sample transition weight and the sample basic weight in the selected training sample, the sort weight corresponding to the selected training sample using the target initial discriminative model. The adjusting unit 503 may be configured to: adjust a parameter of the target initial discriminative model according to the difference between the sort weight corresponding to the selected training sample and the sample expected weight.

According to the apparatus provided in some embodiments of the present disclosure, the adjusting unit 503 trains the pre-acquired initial discriminative model through the training sample acquired by the second acquiring unit 501 and including the sample transition weight, the sample basic weight and the sample expected weight that correspond to the sample character string of the alphabetic words. Specifically, the sort weight is determined as the adjustment basis according to the second determining unit 502, thus obtaining the trained initial discriminative model. Thus, the preferred direction of a candidate word can be controlled by adjusting a corresponding feature weight. Moreover, this scheme has a smaller number of parameters and a low dependency on a device configuration, which makes the training implemented more easily.

In the technical solution of the present disclosure, the collection, storage, use, processing, transmission, provision, disclosure, etc. of the personal information of a user all comply with the provisions of the relevant laws and regulations, and do not violate public order and good customs.

According to some embodiments of the present disclosure, the present disclosure further provides an electronic device, a readable storage medium and a computer program product.

Figure 6:
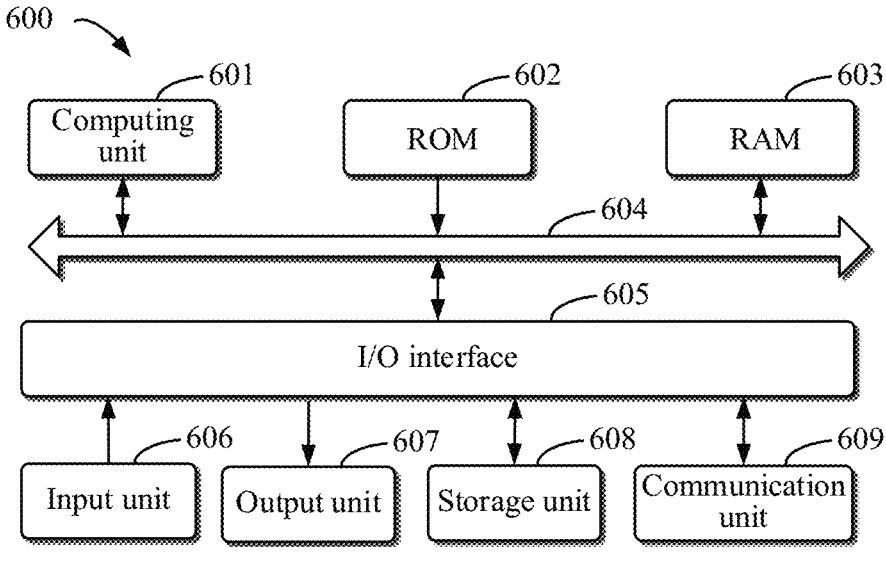
FIG. 6 is a block diagram of an electronic device adapted to implement the method for presenting a candidate character string and a method for training a discriminative model according to some embodiments of the present disclosure.

FIG. 6 is a schematic block diagram of an example electronic device 600 that may be adapted to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital assistant, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the device 600 includes a computing unit 601 that can perform various appropriate actions and processes according to a computer program stored in a read only memory (ROM) 602 or loaded from the storage unit 608 into a random access memory (RAM) 603. In the Ram 603, various programs and data required for the operation of the device 600 may also be stored. The computing unit 601, Rom 602, and ram 603 are connected to each other through a bus 604. Input/output (I/O) interface 605 is also connected to bus 604.

Multiple components in the device 600 are connected to the I/o interface 605, including: an input unit 606, such as a keyboard, a mouse, and the like; an output unit 607, such as various types of displays, speakers, and the like; a storage unit 608, such as a magnetic disk, an optical disk, or the like; and a communication unit 609, such as a network card, a modem, a wireless communication transceiver, and the like. The communication unit 609 allows the device 600 to exchange information/data with other devices through a computer network such as the Internet and/or various telecommunication networks.

The computing unit 601 may be various general-purpose and/or special-purpose processing components with processing and computing capabilities. Some examples of the computing unit 601 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 601 performs various methods and processes described above, such as a method for presenting a candidate string and a method for training a discriminant model. For example, in some embodiments, the method for presenting a candidate string and the method for training a discriminant model may be implemented as a computer software program tangibly contained in a machine-readable medium, such as a storage unit 608. In some embodiments, part or all of the computer program may be loaded and/or installed on the device 600 via the ROM 602 and/or the communication unit 609. When the computer program is loaded into the Ram 603 and executed by the computing unit 601, one or more steps of the method for presenting a candidate string and the method for training a discriminant model described above may be performed. Alternatively, in other embodiments, the computing unit 601 may be configured to perform a method for presenting a candidate string and the method for training a discriminant model by any other suitable means (e.g., by means of firmware).

Various embodiments of the systems and techniques described above herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), computer hardware, firmware, software, and/or a combination thereof. These various embodiments may include: being implemented in one or more computer programs, the one or more computer programs may be executed and/or interpreted on a programmable system including at least one programmable processor, the programmable processor may be a special-purpose or general-purpose programmable processor, and may receive data and instructions from a storage system, at least one input device, and at least one output device, and transmitting data and instructions to the storage system, the at least one input device, and the at least one output device.

The program code for implementing the methods of the present disclosure may be written in any combination of one or more programming languages. These program codes can be provided to the processor or controller of a general-purpose computer, a special-purpose computer or other programmable data processing device, so that the program code, when executed by the processor or controller, enables the functions/operations specified in the flowchart and/or block diagram to be implemented. The program code can be fully executed on the machine, partially executed on the machine, partially executed on the machine and partially executed on the remote machine as a separate software package, or completely executed on the remote machine or server.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. Machine readable media may include, but is not limited to, electronic, magnetic, optical, electromagnetic, infrared, or semiconductor system, apparatus, or device, or any suitable combination of the foregoing. More specific examples of machine-readable storage media may include electrical connections based on one or more lines, portable computer disks, hard disks, random access memory (RAM), read only memory (ROM), erasable programmable read only memory (EPROM or flash memory), optical fibers, compact disk read only memory (CD-ROM), optical storage devices, magnetic storage devices, or any suitable combination of the above.

In order to provide interaction with the user, the systems and techniques described herein may be implemented on a computer having: a display device (e.g., a CRT (cathode ray tube) or LCD (liquid crystal display) monitor) for displaying information to the user; and a keyboard and a pointing device (e.g., a mouse or trackball) through which a user can provide input to a computer. Other kinds of devices can also be used to provide interaction with users. For example, the feedback provided to the user may be any form of sensor feedback (e.g., visual feedback, auditory feedback, or tactile feedback); and the input from the user can be received in any form (including acoustic input, voice input or tactile input).

The systems and techniques described herein may be implemented in a computing system including a background component (e.g., as a data server), or a computing system including a middleware component (e.g., an application server) or a computing system including a front-end component (e.g., a user computer with a graphical user interface or a web browser through which a user can interact with embodiments of the systems and techniques described herein), or a computing system including such a back-end component, a middleware component, or any combination of front-end components. The components of the system may be interconnected by digital data communication (e.g., a communication network) in any form or medium. Examples of communication networks include local area networks (LANs), wide area networks (WANs), and the Internet.

A computer system may include a client and a server. The client and server are generally far away from each other and usually interact through a communication network. A client server relationship is generated by a computer program running on the corresponding computer and having a client server relationship with each other. The server can be a cloud server, a distributed system server, or a blockchain server.

It should be understood that steps can be reordered, added, or deleted using the various forms of processes shown above. For example, the steps described in the present disclosure can be performed in parallel, in sequence, or in different orders. As long as the desired results of the technical solution of the present disclosure can be achieved, this article is not limited here.

The above specific embodiments do not constitute restrictions on the scope of the present disclosure. Those skilled in the art should understand that various modifications, combinations, sub combinations and substitutions can be made according to design requirements and other factors. Any modification, equivalent replacement and improvement made within the spirit and principles of this disclosure shall be included in the scope of protection of this disclosure.

What is claimed is:

1. A method for presenting a candidate character string at a mobile terminal, comprising:
   acquiring a character string of alphabetic words inputted by a user;
   determining a character transition weight of the character string, the character transition weight being used to characterize a transition probability of a character;
   generating a sort weight corresponding to the character string based on a pre-acquired basic weight matching the character string and the character transition weight; and
   selecting, according to an order indicated by the sort weight, at least two candidate character strings matching the character string from a pre-acquired candidate character string set, thereby improving the accuracy of the candidate character strings, and presenting the at least two candidate character strings at the mobile terminal,
   wherein generating the sort weight comprises
   multiplying the pre-acquired basic weight and the character transition weight by pre-acquired coefficients, respectively, to generate a first result, and
   performing post-processing based on the first result to generate a second result as the sort weight corresponding to the character string.

2. The method according to claim 1, wherein determining the character transition weight of the character string comprises:
   selecting at least one matching probability from a preset transition probability table of N-nary characters according to a sub character string contained in the character string; and
   generating the character transition weight of the character string according to the selected probability.

3. The method according to claim 2, wherein generating the character transition weight of the character string according to the selected probability comprises:
   fusing the selected probability into a total probability; and
   converting the total probability into an integer to be used as the character transition weight of the character string.

4. The method according to claim 1, wherein performing the post-processing based on the first result to generate the second result as the sort weight corresponding to the character string comprises:
   generating a third result according to a length coefficient corresponding to the pre-acquired coefficients and a length of the character string; and
   adding the first result and the third result to generate the second result.

5. The method according to claim 1, wherein performing the post-processing based on the first result to generate the second result as the sort weight corresponding to the character string comprises:
   adding the first result and a bias coefficient corresponding to the pre-acquired coefficients to generate the second result.

6. The method according to claim 1, wherein the pre-acquired coefficients are obtained by training a discriminative model according to a training sample.

7. The method according to claim 6, wherein multiplying the pre-acquired basic weight and the character transition weight by the pre-acquired coefficients respectively to generate the first result comprises:

selecting, according to whether the character string contains a preset priori character string, a group of matching coefficients from two groups of coefficients obtained in advance by training; and multiplying the pre-acquired basic weight and the character transition weight by the selected matching coefficients respectively to generate the first result.

8. The method according to claim 1, wherein the basic weight is associated with at least one of: an n-gram language model, a default value, or a length of a character string.

9. A method for obtaining the pre-acquired coefficients of claim 6 by training a discriminative model, comprising:

acquiring a training sample set, a training sample in the training sample set comprising a sample transition weight, a sample basic weight and a sample expected weight, wherein the sample transition weight, the sample basic weight and the sample expected weight correspond to a sample character string of alphabetic words;

selecting the training sample from the training sample set and determining, according to the sample transition weight and the sample basic weight in the selected training sample, a sort weight corresponding to the selected training sample using a pre-acquired initial discriminative model which comprises to-be-adjusted coefficients, the determining comprising multiplying the to-be-adjusted coefficients respectively by the sample transition weight and the sample basic weight in the selected training sample, and determining the result obtained by adding the obtained products as the sort weight corresponding to the selected training sample; and adjusting a parameter of the initial discriminative model according to a difference between the sort weight corresponding to the selected training sample and the sample expected weight, thereby generating the pre-acquired coefficients.

10. The method according to claim 9, wherein the training sample set comprises positive samples and negative samples in a preset proportion, a sample expected weight corresponding to a positive sample is used to indicate an expectation that the sample character string is a first choice for a candidate character string, and a sample expected weight corresponding to a negative sample is used to indicate an expectation that the sample character string is a non-first choice for the candidate character string.

11. The method according to claim 9, wherein the training sample in the training sample set further comprises a character string length corresponding to the sample character string, and the sample basic weight is associated with the character string length corresponding to the sample character string.

12. The method according to claim 9, wherein selecting the training sample from the training sample set and determining, according to the sample transition weight and the sample basic weight in the selected training sample, the sort weight corresponding to the selected training sample using the pre-acquired initial discriminative model comprises:

selecting a matching initial discriminative model from two preset initial discriminative models as a target initial discriminative model, according to whether the training sample selected from the training sample set contains a preset priori character string; and determining, according to the sample transition weight and the sample basic weight in the selected training sample, the sort weight corresponding to the selected training sample using the target initial discriminative model, and adjusting the parameter of the initial discriminative model according to the difference between the sort weight corresponding to the selected training sample and the sample expected weight comprises:

adjusting a parameter of the target initial discriminative model according to the difference between the sort weight corresponding to the selected training sample and the sample expected weight.

13. An apparatus for training a discriminative model, comprising:

at least one processor; and a storage device, wherein the storage device stores an instruction executable by the at least one processor, and the instruction, when executed by the at least one processor, causes the processor to perform the method according to claim 9.

14. A non-transitory computer readable storage medium, storing a computer instruction, wherein the computer instruction when executed by a computer causes the computer to perform the method according to claim 9.

15. A non-transitory computer readable storage medium, storing a computer instruction, wherein the computer instruction when executed by a computer causes the computer to perform the method according to claim 1.

16. A mobile terminal for presenting a candidate character string, comprising:

at least one processor; and a storage device, wherein the storage device stores an instruction executable by the at least one processor, and the instruction, when executed by the at least one processor, causes the processor to perform operations comprising:

acquiring a character string of alphabetic words inputted by a user;

determining a character transition weight of the character string, the character transition weight being used to characterize a transition probability of a character;

generating a sort weight corresponding to the character string based on a pre-acquired basic weight matching the character string and the character transition weight; and selecting, according to an order indicated by the sort weight, at least two candidate character strings matching the character string from a pre-acquired candidate character string set for presentation, thereby improving the accuracy of the candidate character strings, and presenting the at least two candidate character strings at the mobile terminal, wherein generating the sort weight comprises multiplying the pre-acquired basic weight and the character transition weight by pre-acquired coefficients respectively to generate a first result, and performing post-processing based on the first result to generate a second result as the sort weight corresponding to the character string.

\* \* \* \* \*